(12) United States Patent
Schumacher et al.

(10) Patent No.: US 7,415,886 B2
(45) Date of Patent: Aug. 26, 2008

(54) PRESSURE SENSOR WITH DEFLECTABLE DIAPHRAGM

(75) Inventors: Mark Schumacher, Minneapolis, MN (US); Andrew Klosinski, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 74 days.

(21) Appl. No.: 11/312,062

(22) Filed: Dec. 20, 2005

(65) Prior Publication Data

US 2007/0151349 A1 Jul. 5, 2007

(51) Int. Cl.
*G01L 9/12* (2006.01)
(52) U.S. Cl. .......................................... 73/718; 73/724
(58) Field of Classification Search .................. 73/718, 73/724
See application file for complete search history.

(56) References Cited

U.S. PATENT DOCUMENTS

| | | | | |
|---|---|---|---|---|
| 2,533,339 A | 12/1950 | Willenborg | ................ | 177/311 |
| 3,012,432 A | 12/1961 | Moore et al. | .................. | 73/40 |
| 3,218,863 A | 11/1965 | Calvert | ..................... | 73/398 |
| 3,232,712 A | 2/1966 | Stearns | ..................... | 23/255 |
| 3,249,833 A | 5/1966 | Vosteen | ..................... | 317/246 |
| 3,374,112 A | 3/1968 | Danon | ..................... | 117/226 |
| 3,557,621 A | 1/1971 | Ferran | ..................... | 73/398 |
| 3,697,835 A | 10/1972 | Satori | ..................... | 317/246 |
| 3,808,480 A | 4/1974 | Johnston | ..................... | 317/256 |
| 3,924,219 A | 12/1975 | Braun | ..................... | 338/34 |
| 4,008,619 A | 2/1977 | Alcaide et al. | ................ | 73/398 |
| 4,120,206 A | 10/1978 | Rud, Jr. | ..................... | 73/718 |
| 4,158,217 A | 6/1979 | Bell | ............... | 361/283 |
| 4,168,518 A | 9/1979 | Lee | ............... | 361/283 |
| 4,177,496 A | 12/1979 | Bell et al. | .................. | 361/283 |
| 4,227,419 A | 10/1980 | Park | ............... | 73/724 |
| 4,244,226 A | 1/1981 | Green et al. | .................. | 73/703 |
| 4,287,553 A | 9/1981 | Braunlich | .................. | 361/283 |
| 4,322,775 A | 3/1982 | Delatorre | .................. | 361/283 |
| 4,336,567 A | 6/1982 | Anastasia | .................. | 361/283 |
| 4,358,814 A | 11/1982 | Lee et al. | .................. | 361/283 |
| 4,370,890 A | 2/1983 | Frick | ..................... | 73/718 |
| 4,389,895 A | 6/1983 | Rud, Jr. | ..................... | 73/724 |
| 4,422,125 A | 12/1983 | Antonazzi et al. | ........... | 361/283 |

(Continued)

FOREIGN PATENT DOCUMENTS

DE 3340834 A1 5/1985

(Continued)

OTHER PUBLICATIONS

Donald E. Harasyn and Charles R. Willcox, "Line Pressure Measurement Using Differential Pressure Sensor", U.S. Appl. No. 11/140,681, filed May 27, 2005; 31 pages.

(Continued)

*Primary Examiner*—Andre J Allen
(74) *Attorney, Agent, or Firm*—Westman, Champlin & Kelly, P.A.

(57) ABSTRACT

A pressure sensor for sensing a pressure of a process fluid includes a sensor body having a cavity formed therein. A deflectable diaphragm is positioned in the cavity and deflects in response to a pressure applied to the cavity. An electrode on the diaphragm forms a variable capacitor with the pressure sensor body. The capacitance varies in response to the applied pressure.

29 Claims, 4 Drawing Sheets

U.S. PATENT DOCUMENTS

| | | | |
|---|---|---|---|
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,531,415 A * | 7/1985 | Orlowski et al. | 73/718 |
| 4,542,436 A | 9/1985 | Carusillo | 361/283 |
| 4,558,184 A * | 12/1985 | Busch-Vishniac et al. | 381/174 |
| 4,562,742 A | 1/1986 | Bell | 73/718 |
| 4,578,735 A | 3/1986 | Knecht et al. | 361/283 |
| 4,586,108 A | 4/1986 | Frick | 361/283.3 |
| 4,670,733 A | 6/1987 | Bell | 338/36 |
| 4,785,669 A | 11/1988 | Benson et al. | 73/718 |
| 4,829,826 A | 5/1989 | Valentin et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,469,749 A | 11/1995 | Shimada et al. | 73/861.47 |
| 5,492,016 A | 2/1996 | Pinto et al. | 73/724 |
| 5,524,492 A | 6/1996 | Frick et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/511 |
| 5,757,608 A | 5/1998 | Bernot et al. | 361/283.4 |
| 5,760,310 A | 6/1998 | Rud et al. | 73/706 |
| 5,911,162 A | 6/1999 | Denner | 73/718 |
| 5,920,016 A | 7/1999 | Broden | 73/756 |
| 5,969,258 A | 10/1999 | Gerst et al. | 73/718 |
| 5,992,240 A | 11/1999 | Tsuruoka et al. | 73/718 |
| 6,295,875 B1 * | 10/2001 | Frick et al. | 73/718 |
| 6,431,005 B1 * | 8/2002 | Delaye | 73/724 |
| 6,484,585 B1 | 11/2002 | Sittler et al. | 73/718 |
| 6,520,020 B1 | 2/2003 | Lutz et al. | 73/706 |
| 6,564,643 B1 * | 5/2003 | Horie et al. | 73/724 |
| 6,647,794 B1 * | 11/2003 | Nelson et al. | 73/718 |
| 6,654,697 B1 | 11/2003 | Eryurek et al. | 702/47 |
| 6,662,662 B1 | 12/2003 | Nord et al. | 73/715 |
| 6,675,655 B2 | 1/2004 | Broden et al. | 73/716 |
| 6,701,274 B1 | 3/2004 | Eryurek et al. | 702/140 |
| 6,828,801 B1 * | 12/2004 | Burdick et al. | 324/658 |
| 6,892,582 B1 * | 5/2005 | Satou et al. | 73/715 |
| 6,945,115 B1 * | 9/2005 | Wang | 73/718 |
| 6,992,492 B2 * | 1/2006 | Burdick et al. | 324/658 |
| 7,325,457 B2 * | 2/2008 | Fujimori et al. | 73/724 |
| 2002/0178827 A1 * | 12/2002 | Wang | 73/718 |
| 2004/0015069 A1 | 1/2004 | Brown | 600/407 |
| 2004/0168523 A1 | 9/2004 | Fernald et al. | 73/861.01 |
| 2005/0005712 A1 | 1/2005 | Gysling et al. | 73/861.23 |
| 2005/0011278 A1 | 1/2005 | Brown et al. | 73/861.18 |
| 2005/0132808 A1 | 6/2005 | Brown et al. | 73/592 |
| 2006/0206288 A1 | 9/2006 | Brahmajosyula et al. | 702/183 |
| 2006/0278005 A1 | 12/2006 | Broden et al. | 73/716 |
| 2006/0278007 A1 | 12/2006 | Harasyn et al. | 73/723 |
| 2007/0068266 A1 * | 3/2007 | Fujimori et al. | 73/724 |

FOREIGN PATENT DOCUMENTS

| | | |
|---|---|---|
| DE | 43 33 753 A1 | 11/1994 |
| EP | 0 291 393 A1 | 5/1988 |
| EP | 0 524 550 A1 | 1/1993 |
| WO | WO 99/53286 | 10/1999 |
| WO | WO 01/59418 | 8/2001 |

OTHER PUBLICATIONS

Notification of Transmittal of the International Search Report and the Written Opinion of the International Searching Authority, or the Declaration of PCT/US2006/020254.

"Notification of Transmittal of the International Search Report and the Written Opinion of the International Searching Authority, or the Declaration" for PCT/US2006/046742.

Notification of Transmittal of the International Search Report and the Written Opinion of the International Searching Authority, or the Declaration of PCT/US2006/020254.

* cited by examiner

PRESSURE SENSOR WITH DEFLECTABLE DIAPHRAGM

BACKGROUND OF THE INVENTION

The present invention relates to pressure sensors. More specifically, the present invention relates to pressure sensors of the type which use a deflectable diaphragm to measure a pressure.

Transmitters are used in process monitoring and control systems to measure various process variables of industrial processes. One type of transmitter measures pressure of process fluid in the process. Various techniques have been used in the pressure sensors used in such transmitters. One well known technique is to use a deflectable metal diaphragm. A capacitance is measured with respect to the diaphragm, with the metal diaphragm forming one of the capacitive plates of the capacitor. As the diaphragm is deflected due to applied pressure, the measured capacitance changes. In such a configuration, there are a number of sources of inaccuracies in pressure measurements.

One technique which addresses these inaccuracies is set forth in U.S. Pat. No. 6,295,875 entitled, "PROCESS PRESSURE MEASUREMENT DEVICES WITH IMPROVED ERROR COMPENSATION" issued Oct. 2, 2001 to Frick et al. which is incorporated herein by reference in its entirety. This patent describes a differential pressure sensor that includes an additional electrode for use in reducing measurement inaccuracies.

SUMMARY

A pressure sensor for sensing a pressure of a process fluid includes a sensor body having a cavity with a pressure connection through the cavity into the sensor body. A deflectable diaphragm in the cavity deflects in response to a pressure applied to the cavity through the pressure connection. An electrode on the diaphragm forms a variable capacitor with the pressure sensor body and provides a capacitance which varies in response to the applied pressure.

DETAILED DESCRIPTION

The present invention provides a pressure sensor in which a deflectable diaphragm carries a capacitive plate to provide a capacitance which varies in response to an applied pressure. As discussed below, this configuration provides a number of advantages related to manufacturing, reduced errors and improved performance.

Figure 1:
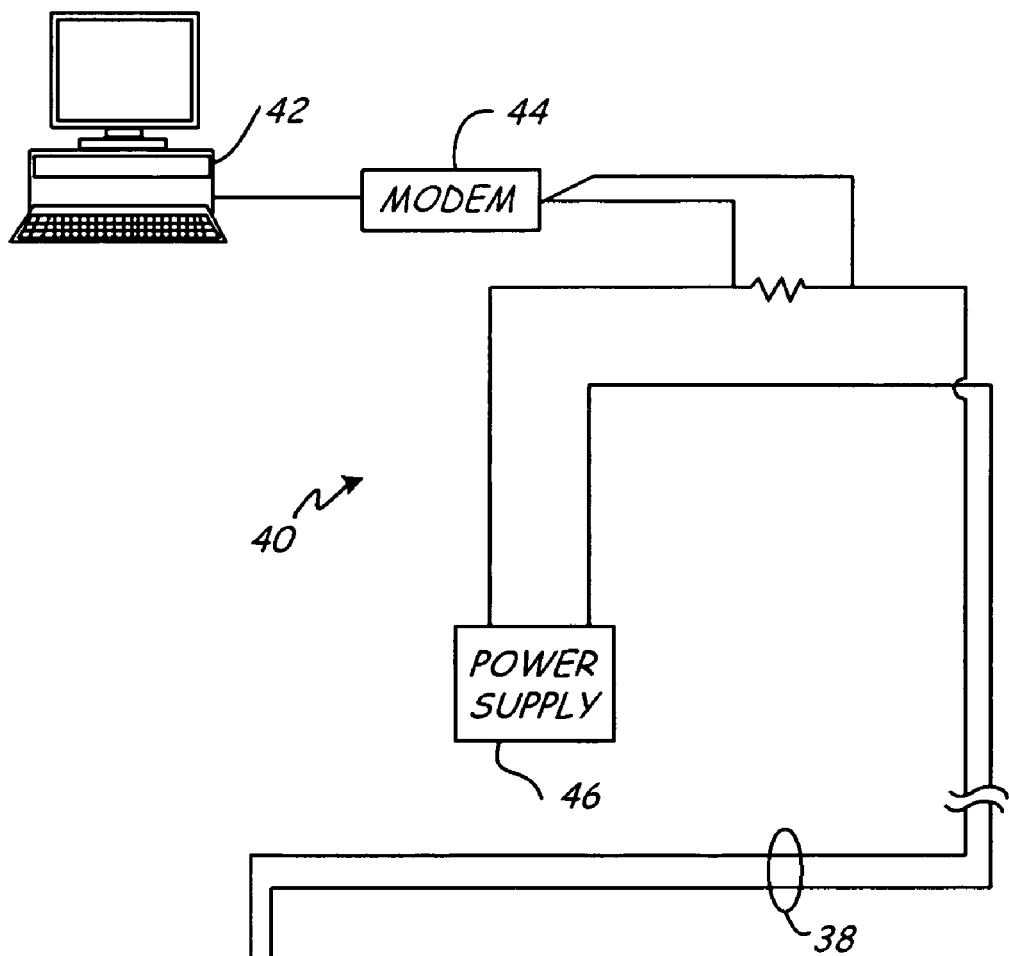
FIG. 1 shows a process measurement system with a process transmitter constructed in accordance with the present invention.
Figure 1:
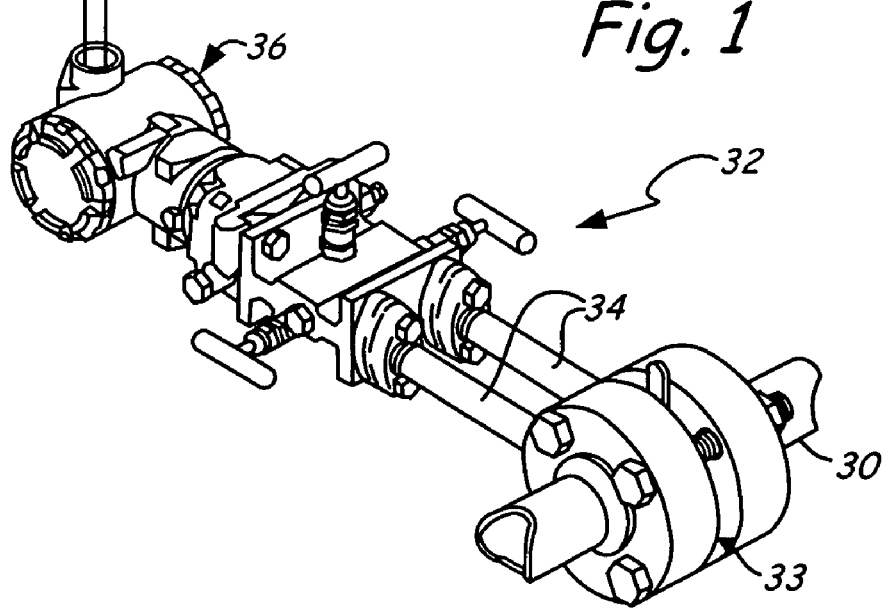

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and outputs a standardized transmission signal that is a function of the process pressure.

A process loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36. The invention is not limited to environments which implement a loop 38. Other communication techniques can be used including other communication media such as wireless and different wireless techniques, as well as different communication protocols and in standalone devices.

Figure 2:
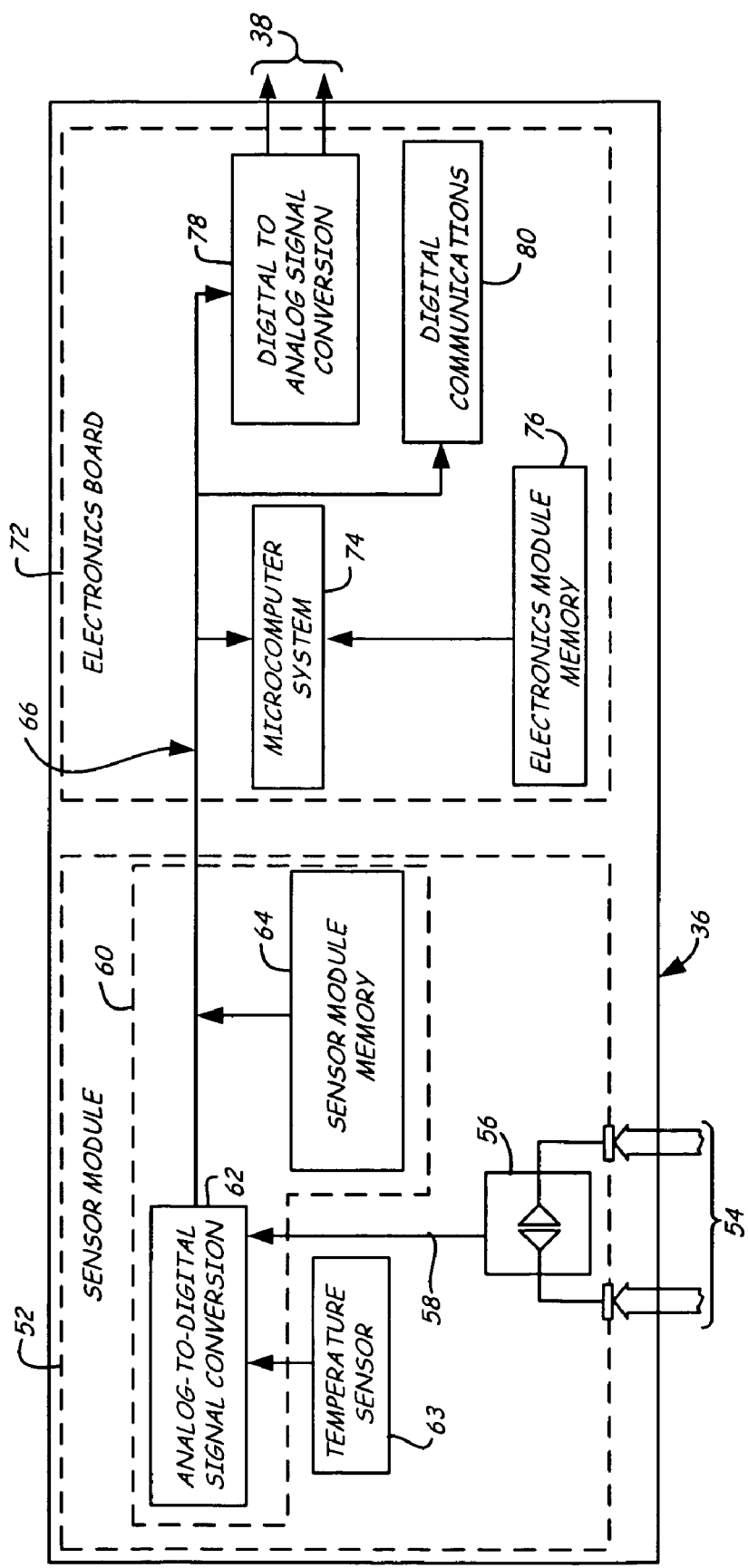
FIG. 2 is schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. As discussed below, the temperature sensor 63 can be formed integral with pressure sensor 56. The electronics board 72 includes a microcomputer system 74, electronics memory module 76, digital to analog signal converter 78 and digital communication block 80.

One technique for measuring different pressure is set forth in U.S. Pat. No. 6,295,875 to Frick et al. However, the present invention is not limited to such a configuration.

Figure 3A:
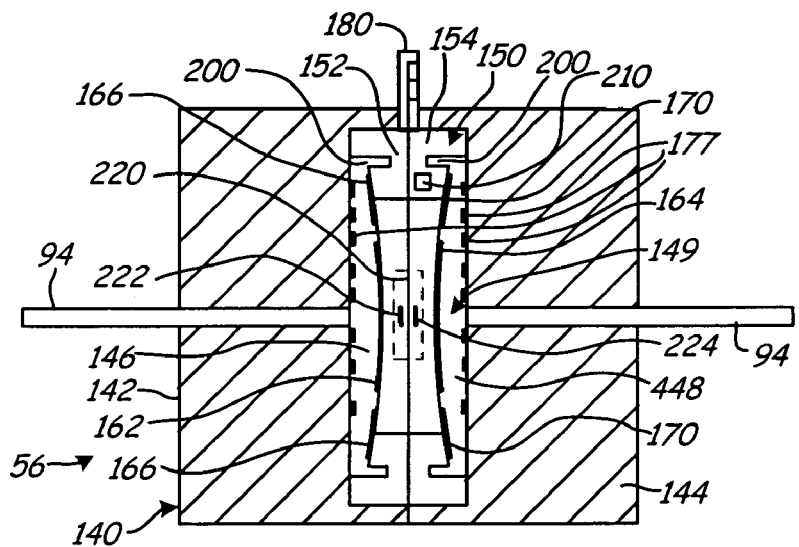
FIG. 3A is a side cross-sectional view of a pressure sensor in accordance with the present invention.

FIG. 3A is a side cross-sectional view showing pressure sensor 56 in accordance with the present invention. Pressure sensor 56 includes a pressure sensor body 140 which is formed by half bodies 142 and 144 which have recessed regions 146 and 148 formed therein, respectively, which form a cavity 149 therebetween. A deflectable diaphragm 150 is mounted in the cavity 149 and the cavity 149 couples to impulse piping 94. Diaphragm 150 is formed of two half diaphragms 152 and 154. Center capacitor plates or electrodes 162 and 164 are carried on diaphragm halves 152 and 154, respectively. Similarly, diaphragm half 152 carries outer capacitor plate or electrode 166 while diaphragm half 154 carries outer capacitor plate or electrode 172. Capacitor plates 162, 164, 166, 168, 170 and 172 for 6 respective electrical capacitors with sensor body 140. A contact protrusion 180 extends from center diaphragm 150 and carries electrical contacts 182 thereon. Electrical contacts 182 connects to each of the six capacitor plates or electrodes 162 through 172.

Figure 3B:
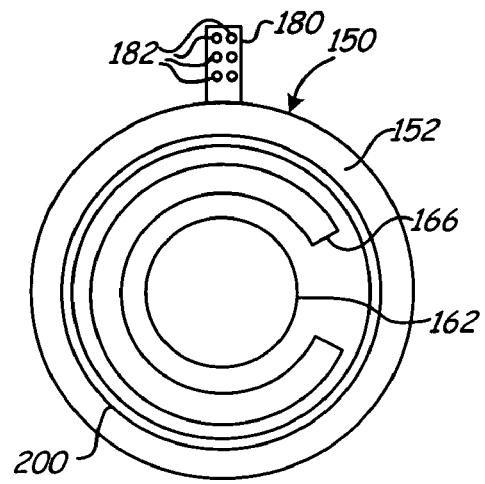
FIG. 3B is a front plan view of a diaphragm of the pressure sensor shown in FIG. 3A.
Figure 3C:
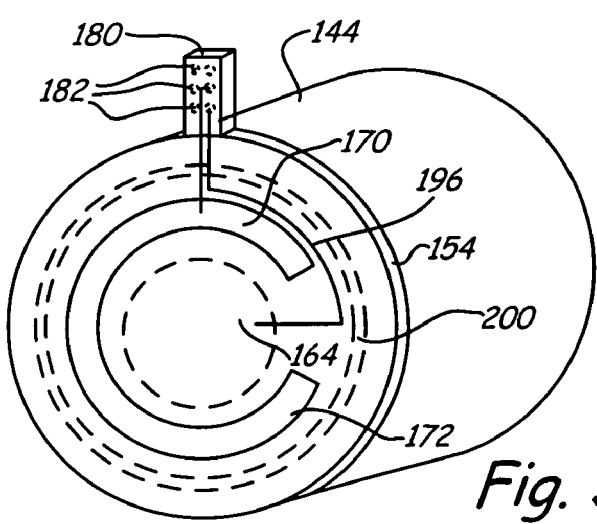
FIG. 3C is a perspective view showing half of the diaphragm of FIG. 3A and half of a sensor body of FIG. 3A.

FIG. 3B is a front plan view showing deflectable diaphragm 150 including the arrangement of capacitor plates 162 and 166 in greater detail. FIG. 3C is a side perspective view showing half diaphragm 154 and half sensor body 144. FIG. 3C also illustrates electrical connections 192 and 196 which electrically connect capacitor plates or electrodes 170 and 164, respectively, to contacts 182 on protrusion 180. FIGS. 3A and 3B also show annular notches 20Q which can be formed in the diaphragm 150 to increase the amount of deflection of diaphragm 150 for a given pressure.

During operation, a differential pressure is applied to either side of diaphragm 154 through impulse piping 94. This causes deflection of diaphragm 150 within cavity 149. As diaphragm 150 deflects, the distance between capacitor plates 162, 164, 166, 168, 170, 172 changes with respect to the sides of cavity 149 formed by sensor body halves 142 and 144. The electrical capacitance between each capacitor plate 162, 164, 166, 168, 170, 172 can be measured with respect to the sensor body 140 and correlated with the applied differential pressure. The amount of deflection of diaphragm 154 is a function of the applied pressure as well as the material used in diaphragm 154 and the dimensions of diaphragm 154. FIGS. 3A through 3B also show annular notches 200 which can be formed in the diaphragm 150 to increase the amount of deflection of diaphragm 150 for a given pressure.

In one preferred configuration, diaphragm 150 is formed of an insulating crystal material such as silicon, quartz, sapphire, or spinel. The electrodes can comprise a metal and be deposited or implanted on diaphragm 150. The sensor body 140 is formed of a conductive material such as metal. This configuration allows the diaphragm 150 to be assembled and subsequently mounted into body halves 142 and 144. In another configuration, body 140 is of a non-conductive material and include a conductive material for the electrical capacitors with respect to capacitor plates 162, 164, 166, 168, 170, 172. In contrast, some prior art configurations in which the capacitor plates are carried on the walls of the cavity formed in the sensor body. This requires the sensor body to be filled with an insulating material such as glass. In such a configuration, a conductive diaphragm used.

In one optional configuration, features 177 are provided on an internal wall of cavity 146 or on diaphragm 150. Features 177 are configured to distribute forces if an over pressure occurs in which diaphragm 150 is pressed against one of the internal walls of cavity 146.

The pressure sensor 56 of the present invention can be assembled using any appropriate technique. For example, the two diaphragm halves 152 and 154 can be fused together to form the complete diaphragm 150. Additional features such as the diaphragm shape and hinge point can be fabricated as desired. In some embodiments, a temperature sensor 210 is fabricated in diaphragm 150 for use in measuring temperature of the pressure sensor 56. The temperature can be used to compensate for temperature related errors in pressure measurements. The temperature signal can also be used to determine other information about the process fluid, such as for use in a flow rate calculation.

In one embodiment, the completed diaphragm 150 is welded between the two metal sensor body halves 142 and 144 with protrusion 180 extending from the cavity 149 through the sensor body 140 to the outside of body 140. The region where protrusion 180 meets the two sensor half bodies 142 and 144 can be sealed using, for example, a brazing technique. This configuration provides a solid state sensor with electrodes that can be mounted on a solid state material rather than a glass such as used in some prior art configurations. This reduces hysteresis and provides improved stability. Further, the capacitor electrodes on the high and low pressure sides of the diaphragm 150 remain in close proximity which can also provide improved performance over temperature extremes. The center diaphragm 150 can be fabricated using standard solid state fabrication techniques which allow simplified manufacturing, reduced costs and greater tolerance control. Sensor features such as the hinge point, cavity shape, electrodes, electrode lead wires and temperature sensor are etched, deposited or otherwise formed in a solid state center diaphragm structure rather than on a glass/metal pressure sensor half cell as used in prior art designs. This simplifies manufacturing, lowers manufacturing cost and provides greater tolerance control which leads to improved performance.

Referring back to FIG. 3A, an optional internal cavity 220 is illustrated which is located within diaphragm 154 between diaphragm halves 150 and 152. Capacitive plates or electrodes 222 and 224 are positioned on the sides walls of internal cavity 220. Internal cavity 220 is configured such that the spacing between capacitive plates 222 and 224 changes as a function of the applied line pressure. This optional configuration allows both the differential pressure applied to diaphragm 150 through impulse piping 94 to be measured along with the line pressure. In such a configuration, electrical contacts are provided on and protrusion 180 which connect to capacitor plates or electrodes 222 and 224.

Figure 4:
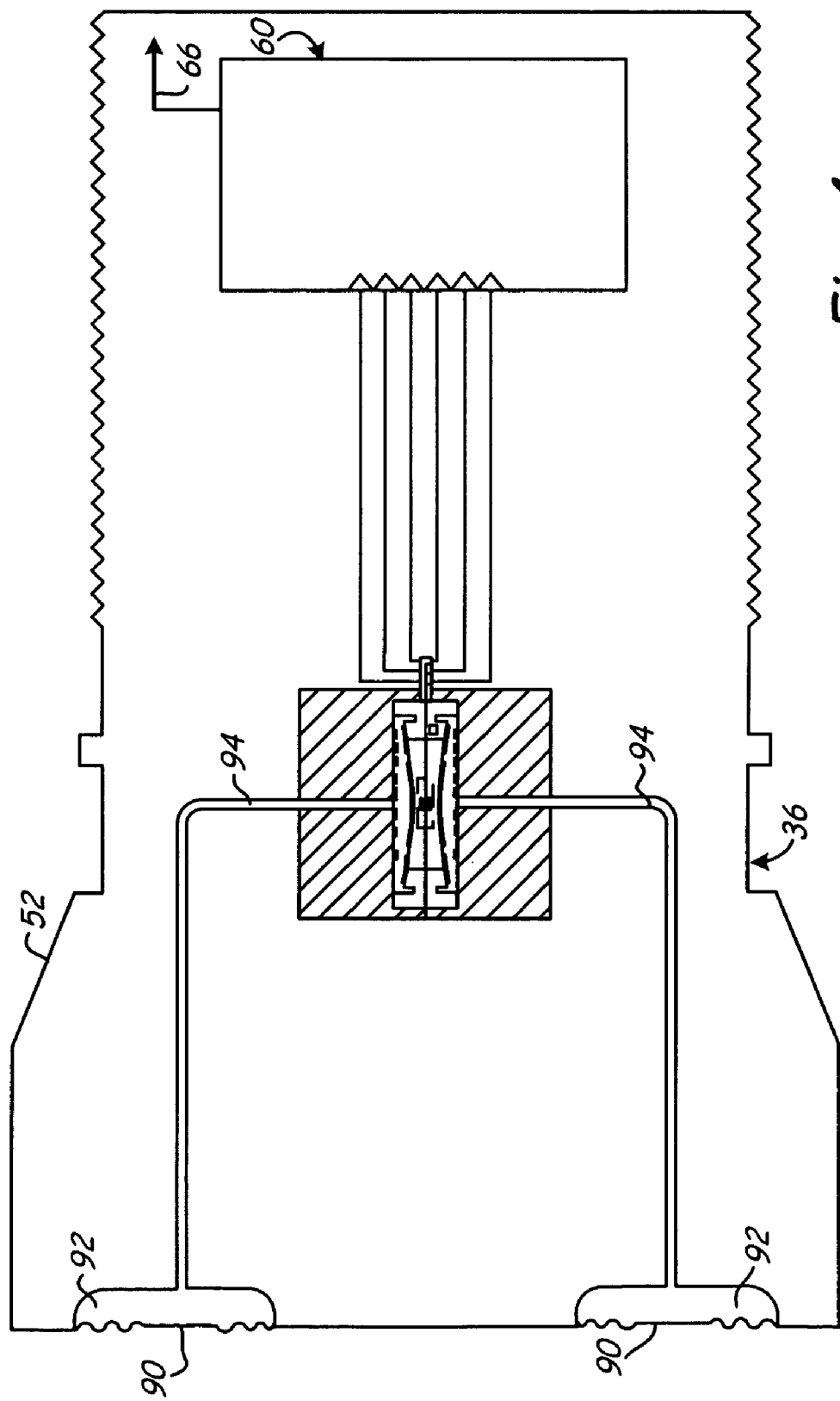
FIG. 4 is a simplified cross-sectional view of the pressure sensor positioned in a process transmitter.

FIG. 4 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, the pressure is transferred to the pressure sensor 56 through the fill fluid in the impulse piping 94.

With the sensor of the present invention, features such as the hinge point, cavity shape, electrodes, electrode lead wires and the temperature sensor can be etched, deposited or otherwise formed in a solid state structure rather than in the glass/metal half cell used in some designs. This reduces manufacturing costs and provides greater tolerance control which allows improved performance. Further, the outside of the pressure sensor is formed of a metal body which can easily contain excessive over pressures. The structure can be formed and mounted using any appropriate technique such as laser welding or brazing. The measurement circuitry used to determine the applied pressure based upon the changing capacitance can be mounted in close proximity to the protrusion 180. This to reduces errors due to stray capacitance from the electrical connections to the capacitor plates. In some configurations, the circuitry is carried directly on protrusion 180. In such a configuration, measurement circuitry can be mounted to protrusion 180, or fabricated directly on protrusion 180.

Although the present invention has been described with reference to preferred embodiments, workers skilled in the art will recognize that changes may be made in form and detail without departing from the spirit and scope of the invention. Pressure measurements may be made using the pressure sensor discussed above using any appropriate technique. One example technique is described in U.S. patent application Ser. No. 11/140,681, Line Pressure Measurement Using Differential Pressure Sensor, filed May 27, 2005 which is incorporated herein by reference. The particular configuration illustrated in the Figures in which four different capacitors are formed can be used to compensate for errors as discussed in application Ser. No. 11/140,681. In one embodiment, any number of capacitors are used including a single capacitor, two capacitors, etc. The present invention is not limited to any particular number of capacitors or configuration of capacitor plates. Although the above description discusses an oil fill fluid, other fill fluids may be used, including an air or gas fill. The diaphragm can be configured to deflect as desired. In one configuration, the diaphragm deflection may be less than one angstrom. The center diaphragm structure can have any shape and/or feature as desired for particular implementation. For example, the diaphragm can have hinge features to promote bending at certain points, ceiling features, etc. This allows the diaphragm to be optimized for performance of the sensor in a particular environment, such as a differential pressure sensor. These features and shapes can be formed using any appropriate method including both additive techniques in which additional structures are added to a sub straight, or subtractive techniques in which material is removed from a sub straight to form a desired shape or feature.

What is claimed is:

1. A pressure sensor for sensing a pressure of a process fluid:
   a sensor body having a cavity formed therein;
   a pressure connection extending through the cavity into the body;
   a deflectable diaphragm in the cavity configured to deflect in response to a pressure applied to the cavity through the pressure connection;
   an electrode carried by the diaphragm configured to form a variable capacitor with the pressure sensor body having a capacitance which varies in response to the applied pressure; and
   an electrical connection to the electrode which extends to outside of the pressure sensor body wherein the sensor body is formed from two sensor body halves.

2. The apparatus of claim 1 wherein the deflectable diaphragm comprises a rigid material.

3. The apparatus of claim 1 wherein the deflectable diaphragm comprises a crystal material.

4. The apparatus of claim 1 wherein the deflectable diaphragm comprises a material selected from the group of materials consisting of silicon, quartz, sapphire and spinel.

5. The apparatus of claim 1 wherein the sensor body comprises a conductive material.

6. The apparatus of claim 1 wherein the sensor body comprises a metal.

7. The apparatus of claim 1 wherein the diaphragm is formed from two diaphragms halves.

8. The apparatus of claim 1 including a second electrode carried by the diaphragm configured to form a second variable capacitor with the pressure sensor body.

9. The apparatus of claim 8 wherein the electrode and the second electrode are on opposite sides of the diaphragm.

10. The apparatus of claim 1 wherein two electrodes are positioned on one side of the diaphragm and two electrodes are positioned on an opposite side of the diaphragm.

11. The apparatus of claim 1 wherein the diaphragm includes an internal diaphragm cavity configured to deform in response to a line pressure applied to the cavity of the sensor body.

12. The apparatus of claim 11 wherein the internal diaphragm cavity includes electrodes configured to form a variable capacitance which changes based upon the applied line pressure.

13. The apparatus of claim 1 wherein the cavity of the sensor body receives a differential pressure and deflection of the diaphragm is based upon the differential pressure.

14. The apparatus of claim 1 including a temperature sensor configured to measure a temperature of the sensor body or diaphragm.

15. The apparatus of claim 1 including a protrusion from the diaphragm which carries the electrical connections from the diaphragm to outside of the pressure sensor body.

16. A method of sensing pressure of a process fluid, comprising:
   providing an electrode carried by a deflectable diaphragm;
   placing the deflectable diaphragm in a sensor body;
   applying a pressure to the deflectable diaphragm through the sensor body to thereby cause deflection;
   measuring changes in a capacitance between the electrode on the deflectable diaphragm and the sensor body; and
   determining pressure based upon changes in the measured capacitance wherein the sensor body is formed from two sensor body halves.

17. The method of claim 16 wherein the deflectable diaphragm comprises a rigid material.

18. The method of claim 16 wherein the deflectable diaphragm comprises a crystal material.

19. The method of claim 16 wherein the deflectable diaphragm comprises a material selected from the group of materials consisting of silicon, quartz, sapphire and spinel.

20. The method of claim 16 wherein the sensor body comprises a conductive material.

21. The method of claim 16 wherein the diaphragm is formed from two diaphragms halves.

22. The method of claim 16 including providing a second electrode on the diaphragm configured to form a second variable capacitor with the pressure sensor body.

23. The method of claim 16 including forming a diaphragm internal cavity in the diaphragm configured to deform in response to a line pressure applied to the cavity of the sensor body.

24. The method of claim 23 including providing electrodes in the diaphragm internal cavity configured to form a variable capacitance which changes based upon the applied line pressure.

25. The method of claim 16 including providing a temperature sensor configured to measure a temperature of the sensor body or diaphragm.

26. The apparatus of claim 1 wherein the deflectable diaphragm comprises an insulator.

27. The method of claim 16 wherein the deflectable diaphragm comprises an insulator.

28. The apparatus of claim 1 wherein the electrode is deposited on a surface of the diaphragm.

29. The method of claim 16 including depositing the electrode on a surface of the diaphragm.

* * * * *